UNITED STATES PATENT OFFICE.

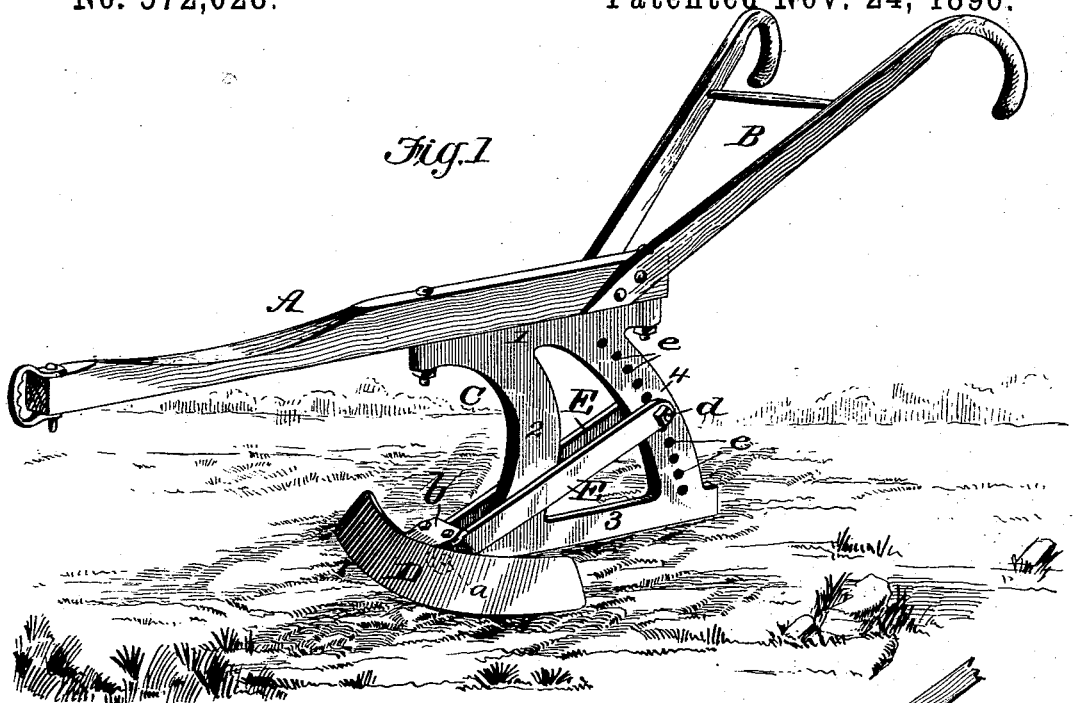
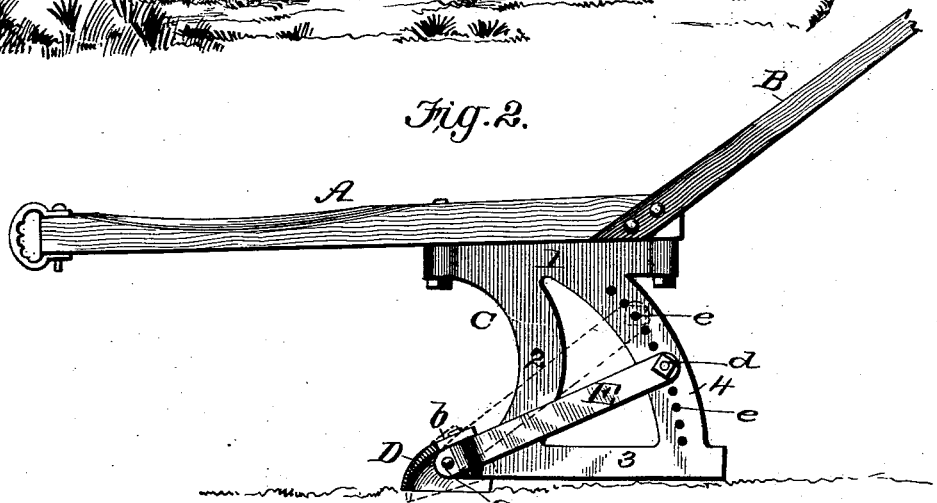
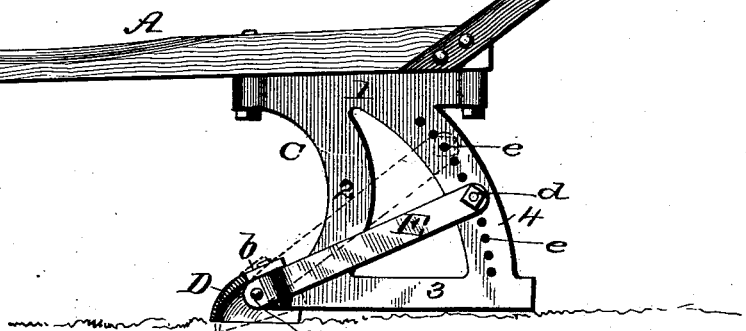
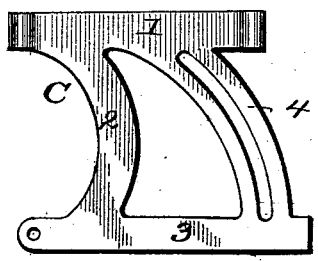

RICHARD H. PURNELL, OF ROSEDALE, MISSISSIPPI.

PLOW.

SPECIFICATION forming part of Letters Patent No. 572,028, dated November 24, 1896.

Application filed June 16, 1896. Serial No. 595,722. (No model.)

*To all whom it may concern:*

Be it known that I, RICHARD H. PURNELL, of Rosedale, in the county of Bolivar and State of Mississippi, have invented a new and useful Improvement in Plows, of which the following is a specification.

My invention is in the nature of an improvement in plows of that form which carry a sweep or scraper; and it consists in such peculiar construction and arrangement of parts as will enable the sweep to be adjusted to any depth in a simple and practical way, as will be hereinafter more fully described.

Figure 1 is a perspective view of the plow complete. Fig. 2 is a side elevation, partly in section; and Fig. 3 is a detail of a modification.

In the drawings, A represents the beam, and B the handles, which are of the ordinary construction.

C is the standard, which is made either of cast or wrought metal bolted to the under side of the beam and consisting of a flat upper bar 1, a forwardly-curved front bar 2, a bottom bar 3, and a broad rear bar 4, all made in one piece.

To the forward lower edge of the standard, at the junction of the bars 2 and 3, there is pivoted upon a bolt $a$ the sweep or scraper D. This sweep is provided with a central rearwardly-projecting lug $b$, that is detachably fastened to or made a part of and rigidly attached to two side bars E E, whose forward ends are fulcrumed upon the bolt $a$ and thence extend, one on each side of the standard, to the rear bar 4 of the latter. The rear ends of these side bars are connected by a cross-bolt $d$, which passes through one of a curved series of holes $e$ in the rear bar 4 of the standard. The curve of these holes is struck from the bolt $a$ as a center, so that the bolt $d$ at the rear end of the side bars may easily fit in any one of them. Instead of a series of holes a curved slot may be used, as seen in Fig. 3. By adjusting these side bars to any inclination and tightening the bolt $d$ by screwing up its nut the side bars are made to pinch the rear bar of the standard and hold the sweep and side bars to any adjustment within the limits of the curved holes or slot. When this sweep and its attached side bars are thus adjusted, as indicated in dotted lines in Fig. 2, it will be seen that the angle of the sweep and the altitude of the front edge may be changed in a simple and convenient manner to vary the depth of the sweep without any adjustment of the clevis, harness, or any other appliances.

Any kind of plowshare or blade in the form of a bull-tongue, half-shovel, or scraper may be used.

In making use of my invention I do not limit myself to the two bars E E, as it is obvious that one of the bars might be dispensed with and the sweep still be locked rigidly and adjusted, as hereinbefore described. The two bars make a stronger connection, however, and are to be preferred.

Having thus described my invention, what I claim as new, and desire to secure by Letters Patent, is—

1. The combination with a plow-standard; of a side bar pivoted or fulcrumed at its front end to the front lower edge of the standard and bearing at said front end a rigidly-attached sweep or scraper-blade, and at its rear end having a clamping-bolt for adjustably connecting it to the standard to vary the inclination and depth of the sweep substantially as and for the purpose described.

2. The combination with a plow-standard; of a pair of side bars arranged one upon each side of the standard and pivoted or fulcrumed at their front ends to the front lower edge of the standard and bearing at this point a rigidly-attached sweep or scraper-blade, and at their rear ends embracing the rear part of the standard and connected together thereupon by a clamping-bolt substantially as and for the purpose described.

3. The combination of a plow-standard having a curved series of holes in its rear portion, a pair of side bars pivoted at their front ends to the front lower edge of the standard, and having at their rear ends a clamping-bolt passing through one of said holes of the standard, and a sweep or scraper rigidly attached to the front ends of the side bars and adjustable with them as described.

RICHARD H. PURNELL.

Witnesses:
W. P. BAKER,
W. A. SHELBY.